(12) United States Patent
Vincent et al.

(10) Patent No.: US 10,902,100 B2
(45) Date of Patent: Jan. 26, 2021

(54) METHODS FOR DETERMINING WHEN A DEVICE IS WORN BY A USER

(71) Applicant: ARM IP LIMITED, Cambridge (GB)

(72) Inventors: Hugo John Martin Vincent, Cambridge (GB); Geraint Luff, Cambridge (GB)

(73) Assignee: ARM IP Limited, Cambridge (GB)

( * ) Notice: Subject to any disclaimer, the term of this patent is extended or adjusted under 35 U.S.C. 154(b) by 206 days.

(21) Appl. No.: 15/755,064

(22) PCT Filed: Jul. 14, 2016

(86) PCT No.: PCT/GB2016/052126
§ 371 (c)(1),
(2) Date: Feb. 24, 2018

(87) PCT Pub. No.: WO2017/032967
PCT Pub. Date: Mar. 2, 2017

(65) Prior Publication Data
US 2018/0247036 A1 Aug. 30, 2018

(30) Foreign Application Priority Data
Aug. 25, 2015 (GB) .................................. 1515107.9

(51) Int. Cl.
*G06F 21/30* (2013.01)
*G06F 21/31* (2013.01)
(Continued)

(52) U.S. Cl.
CPC .............. *G06F 21/31* (2013.01); *G06F 21/32* (2013.01); *G06K 9/00335* (2013.01);
(Continued)

(58) Field of Classification Search
CPC ...................................................... G06F 21/32
See application file for complete search history.

(56) References Cited

U.S. PATENT DOCUMENTS 7,571,468 B1    8/2009  Williams
8,055,469 B2 *  11/2011 Kulach .............. G06K 9/00536
                                                   702/141
(Continued)

FOREIGN PATENT DOCUMENTS

WO    WO 2009/136234 A2    11/2009
WO    WO 2013/191491 A1    12/2013
(Continued)

OTHER PUBLICATIONS

International Search Report & Written Opinion for PCT/GB2016/052126, dated Nov. 3, 2016, 9 pages.
(Continued)

*Primary Examiner* — Josnel Jeudy
(74) *Attorney, Agent, or Firm* — Patterson Thuente Pedersen, P.A.

(57) ABSTRACT

A method for determining when a device is attached to a user, the method comprising activating an accelerometer provided at the device; activating a vibration motor provided at the device; measuring with the accelerometer vibrations at the device created by the vibration motor; and using the accelerometer measurements to determine whether the device is attached to the user.

23 Claims, 10 Drawing Sheets

(51) Int. Cl.
  *G06K 9/00* (2006.01)
  *H04W 12/06* (2009.01)
  *G06F 21/32* (2013.01)
(52) U.S. Cl.
  CPC .... *G06K 9/00885* (2013.01); *H04W 12/0605* (2019.01); *G06K 2009/00932* (2013.01)

(56) References Cited

U.S. PATENT DOCUMENTS

| | | | |
|---|---|---|---|
| 2009/0273583 | A1 | 11/2009 | Norhammar |
| 2011/0291821 | A1* | 12/2011 | Chung, II ............. G06F 3/0416 340/407.2 |
| 2014/0372762 | A1* | 12/2014 | Flautner ................ H04L 9/3226 713/173 |
| 2015/0135310 | A1 | 5/2015 | Lee |
| 2015/0161885 | A1* | 6/2015 | Wang .................... G06F 1/1694 340/5.1 |
| 2015/0235227 | A1 | 8/2015 | Lee |
| 2015/0258431 | A1* | 9/2015 | Stafford ................ A63F 13/211 463/31 |
| 2016/0034033 | A1* | 2/2016 | Tao .......................... H04R 3/14 345/173 |

FOREIGN PATENT DOCUMENTS

| | | |
|---|---|---|
| WO | WO 2014/200988 A1 | 12/2014 |
| WO | WO 2015/051253 A2 | 4/2015 |
| WO | WO 2017/032967 A1 | 3/2017 |

OTHER PUBLICATIONS

GB Search and Examination Report for GB 15 15107.9 , dated Jan. 26, 2016, 6 pages.
GB Examination Report dated Jul. 26, 2016 for GB 15 15107.9, 2 pages.
GB Examination Report dated Jun. 8, 2017 for GB 15 15107.9 , 3 pages.
GB Search Report for GB 16 14104.6 , dated Sep. 7, 2016, 4 pages.
GB Examination Report for GB 16 14104.6 , dated Jun. 8, 2017, 2 pages.
PCT International Preliminary Report on Patentability for corresponding International Application No. PCT/GB2016/052126, dated Mar. 8, 2018; 6 pages.

* cited by examiner

METHODS FOR DETERMINING WHEN A DEVICE IS WORN BY A USER

RELATED APPLICATIONS

The present application is a National Phase entry of PCT Application No. PCT/GB2016/052126, filed Jul. 14, 2016, which claims priority from GB Patent Application No. 1515107.9, filed Aug. 25, 2015, said applications being hereby incorporated by reference herein in their entirety.

The present subject matter relates generally to user worn devices. More specifically, methods for determining when the device is worn by a user.

Modern digital systems require the establishment of trusted communication between a user's trusted device and target devices. Typical solutions employed today require a user to provide a password to authenticate the users trusted device to the target device when communication is established. This may require the user to remember a large number of different passwords. This problem becomes greater as the number of target devices with which a user is likely to wish to communicate increases. It is possible that a trusted device, such as a smartphone, may store multiple passwords for a variety of connections to be established. However, in this circumstance it is still necessary to preserve security by providing a password protecting the trusted device itself and the need to frequently enter a password on a trusted device can become burdensome. Furthermore, security based purely upon passwords is vulnerable if the password becomes known to another party.

The present techniques seek to provide a trusted device that provides a secure way of establishing communication with a target device and yet requires a reduced level of on-going user action to establish those communications.

According to one aspect a method for determining when a device is attached to a user is provided. The method comprises: activating an accelerometer provided at the device;

activating a vibration motor provided at the device; measuring with the accelerometer vibrations at the device created by the vibration motor; and using the accelerometer measurements to determine whether the device is attached to the user. It is then possible to determine whether the device needs to be re-authenticated by the user, as when the device is still attached to the user, re-authentication may not be required in order to gain access to the device or perform a function at the device.

According to one aspect a method for determining a retention probability indicating whether a user device is in contact with a user is provided. The method comprising: activating an accelerometer provided at the device; activating a vibration motor provided at the device; measuring with the accelerometer vibrations at the device created by the vibration motor; using the accelerometer measurements to determine the retention probability; and determining that the device is in contact with the user when the retention probability is above a predetermined threshold. It is then possible to determine whether the device needs to be re-authenticated by the user, as when the device is still in contact with the user, re-authentication may not be required in order to gain access to the device or perform a function at the device.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

Reference will now be made, by way of example only, to the accompanying figures in which:

FIG. 1 schematically illustrates a trusted device;

FIG. 2 schematically illustrates two trusted devices;

FIG. 3 schematically illustrates a trusted device and a target device;

FIG. 4 schematically illustrates components of a trusted device;

In the figures, like reference numerals refer to the same or similar elements.

Reference will now be made in detail to the embodiments, examples of which are illustrated in the accompanying drawings. In the following detailed description numerous specific details are set forth by way of examples in order to provide a thorough understanding of the relevant teachings. However, it will be apparent to one of ordinary skill in the art that the present teachings may be practiced without these specific details.

In other instances, well known methods, procedures, components and/or circuitry have been described at a relatively high-level, without detail, in order to avoid unnecessarily obscuring aspects of the present teachings.

Figure 1:
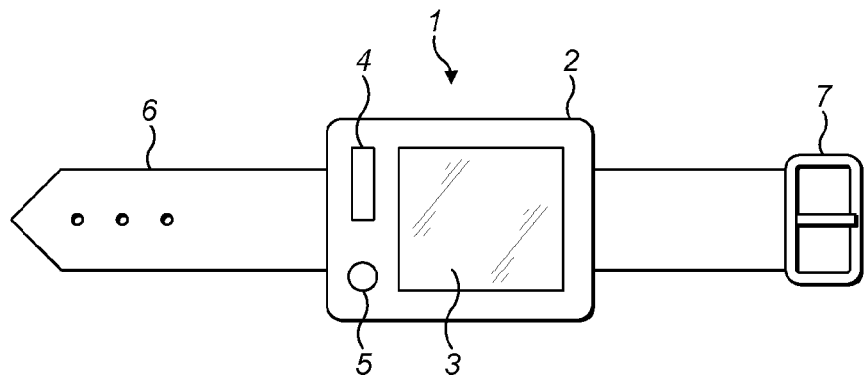

FIG. 1 schematically illustrates a trusted device 1 in the form of a wristwatch. The trusted device 1 includes a main body 2 having a display 3, an authentication sensor 4, an input device 5, a strap 6 and a clasp 7. A user wearing the trusted device 1 may authenticate themselves using the authentication sensor 4, in one example a fingerprint sensor, and switch the trusted device 1 into an authenticated state. The input device 5 is provided so that the user can provide inputs, such as confirming or rejecting communication requests, selecting target devices, inputting secret data etc.

Figure 2:
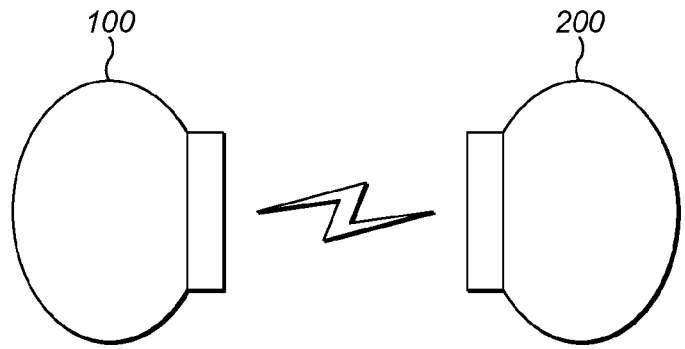

FIG. 2 schematically illustrates two trusted devices, such as illustrated in FIG. 1, between which communication is triggered and then performed. One of the wristwatches 100 may be considered as the trusted device 1 and the other of these wristwatches 200 may be considered as the target device. The trusted device 100 may communicate with many different target devices for many different purposes. Both the trusted device 100 and the target device 200 may be offline (i.e. not in communication with any further device) when the communication between the trusted device 100 and the target device 200 takes place. The communication may be, for example, to pass a virtual key from one user to another user, such as to allow the user of the target device 200 to perform an operation or have access to a device that is secured by the electronic key (e.g. password) that they have just received from the trusted device 100. In one example, the user of the trusted device 100 may give the user of the target device 200 the right to use their car for a predetermined period of time by a secure communication made between the trusted device 100 and the target device 200.

Figure 3:
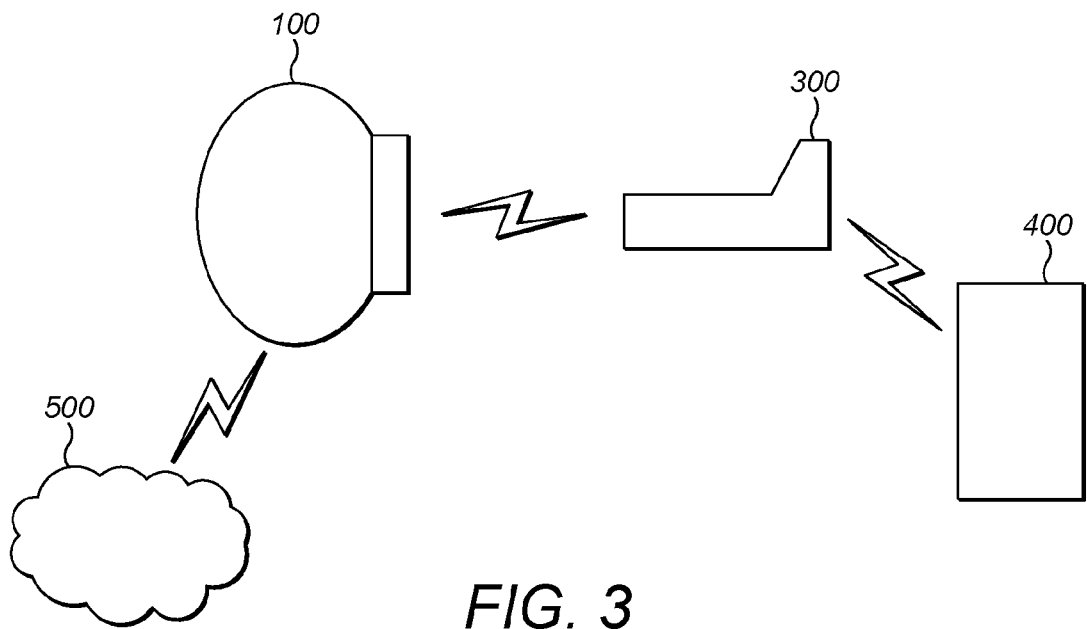

FIG. 3 schematically illustrates a trusted device in the form of a wristwatch 100 and a target device 300 in the form of a point of sale terminal. The point of sale terminal 300 is in communication over the internet with a remote server 400, for example, the server 400 of a merchant or a bank. The trusted device 100 may be in communication with one or more further devices over the internet 500. The communication between the trusted device 100 and the target device 300 is bidirectional. The point of sale terminal 300 may request payment for an item from a user wearing the trusted device 100. The wearer of the trusted device 100 may confirm a displayed identity of the point of sale terminal 300 and a displayed amount to be charged by the point of sale terminal 300 by pressing the input device 5. This confirmation is sent to the point of sale terminal 300 which may then communicate with a bank server 400 in order to request payment from the bank account of the user of the trusted device 100. In addition, a confirmation of approval of the transaction by the user wearing the trusted device 100 may be transmitted via a separate channel using the internet 500 to the bank server 400 indicating that the transaction concerned is authorized. Alternatively, the data sent back from the trusted device 100 to the point of sale terminal 300 may include sufficient encrypted data which when forwarded by the point of sale terminal 300 to the bank server 400 indicates that the user of the trusted device 100 has appropriately authorized the transaction concerned.

Figure 4:
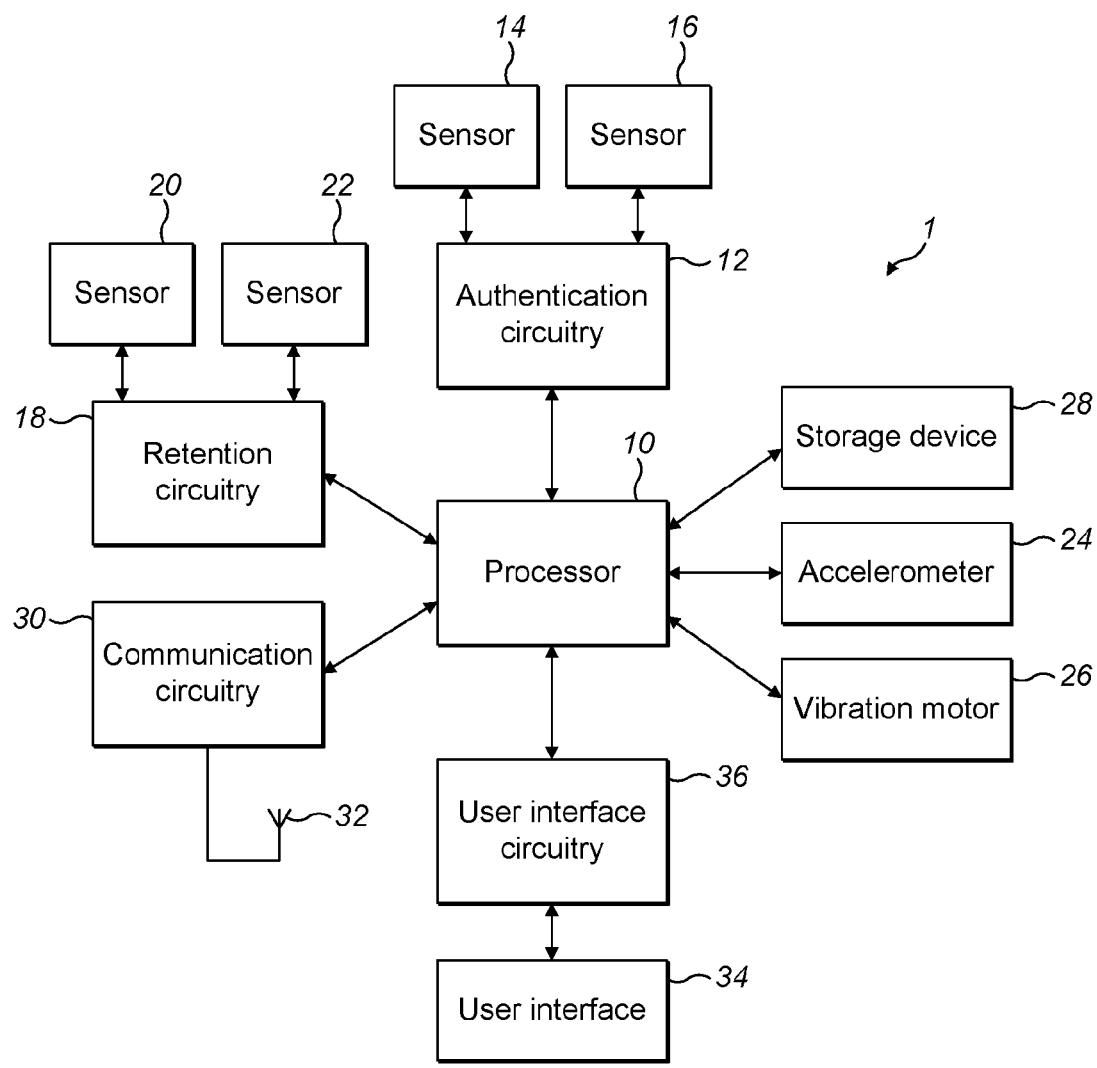

FIG. 4 schematically illustrates components of a trusted device 1. The device 1 comprises a processor 10, authentication circuitry 12 provided with at least one authentication sensor 14, 16, retention circuitry 18 provided with at least one retention sensor 20, 22, an accelerometer 24, a vibration motor 26, a storage device 28, communication circuitry 30 provided with an antenna 32 to receive and transmit signals, and a user interface 34 having user interface circuitry 36.

In one embodiment, the authentication sensors 14, 16 may be a fingerprint sensor, a biometric data sensor etc. or a combination of different types of sensors. Together the authentication circuitry 12 and the at least one authentication sensor 14, 16, authenticates the identity of a user of the device 1.

In one embodiment, the retention sensor 20, 22 may be a temperature sensor, a light detector, a clasp detector etc. or a combination of different types of sensors, which are used to monitor whether the device 1 is in physical possession of the user.

The user interface 34 and user interface circuitry 36 enable the user to interact with the device 1. The user interface 34 may be a display and an input device, or a speaker and microphone.

The processor 10 is coupled to the storage device 18. The processor 10 may be used to coordinate and control the activities of the authentication circuitry 12, the retention circuitry 18, the communication circuitry 30, the accelerometer 24, the vibration monitor 26 and the user interface circuitry 36. The storage device 18 may store programs executed by the processor 10, as well as data received from the authentication circuitry 12, the retention circuitry 18, the communication circuitry 30, the accelerometer 24, the vibration monitor 26 and the user interface.

In one embodiment, a clasp, such as the clasp 7 illustrated in FIG. 1, is the retention sensor 20. The clasp 7, when closed, is used to attach the device 1 to the user. The retention circuitry 18 monitors the clasp 7 once it has been established that the device 1 is attached to the user and the clasp is closed. When the retention circuitry 18 detects that the clasp is opened, it sends a signal to the processor 10 to switch the device out of the authenticated state.

In another embodiment, the retention circuitry 18 is contact detection circuitry configured to detect contact between the device 1 and the user. In one embodiment, a heart rate monitor is the retention sensor 20 for detecting electrical signals (e.g. ECG, EEG etc.) from the user. The contact detection circuitry 18 monitors the heart rate monitor and when a heartbeat is no longer detected, indicating that the device 1 is no longer in contact with the user, it sends a signal to the processor 10 to switch the device out of the authenticated state. In another embodiment, a temperature sensor is the retention sensor 20 for detecting the temperature at a contact area between the device 1 and the user. The contact detection circuitry 18 monitors the temperature sensor and when a temperature change is detected, indicating that the device 1 is no longer in contact with the user, it sends a signal to the processor 10 to switch the device out of the authenticated state.

In another embodiment, the retention circuitry 18 is proximity detection circuitry configured to detect proximity of the device 1 to a proximity device worn by the user, such as a ring worn on the user's finger. In another embodiment, the proximity device is implanted within the user, such as a RFID tag placed under the skin of the user. A proximity sensor acting as the retention sensor 20 detects the distance between itself and the proximity device. The proximity detection circuitry 18 monitors the distance between the proximity sensor and the proximity device and when the distance exceeds a predetermined value (threshold), indicating that the device 1 is no longer in the possession of the user, it sends a signal to the processor 10 to switch the device out of the authenticated state.

In another embodiment, a photo-detector is the retention sensor 20. The photo-detector is shielded from light when the device 1 is in the possession of the user (e.g. the photo-detector receives no light when the watch is worn on the wrist of the user). The retention circuitry 18 monitors the photo-detector and when light is received at the photo-detector, indicating that the device 1 is no longer in contact with the user, it sends a signal to the processor 10 to switch the device out of the authenticated state.

In another embodiment, a chemical detector is the retention sensor 20. The chemical detector is configured to detect a chemical characteristic of the user, e.g. a particular characteristic of the skin chemistry of the user. The retention circuitry 18 monitors the chemical detector and when the characteristic of the skin chemistry of the user changes or is no longer present, indicating that the device 1 is no longer in contact with the user, it sends a signal to the processor 10 to switch the device out of the authenticated state.

In another embodiment, a biometric detector is the retention sensor 20. The biometric detector is configured to detect one or more biometric characteristics of the user. The retention circuitry 18 monitors the biometric detector and when the biometric characteristics are interrupted, indicating that the device 1 is no longer in contact with the user, it sends a signal to the processor 10 to switch the device out of the authenticated state.

In another embodiment, a motion sensor is the retention sensor 20. The motion sensor is configured to detect motion of the device 1 as the user moves when the device is in the possession of the user. For example, the motion sensor may be used to detect a characteristic gait of the user. The retention circuitry 18 monitors the motion sensor and when a signal representing the characteristic gait of the user is not received, indicating that the device 1 is no longer in the possession of the user, it sends a signal to the processor 10 to switch the device out of the authenticated state.

In one embodiment, the device 1 may comprise a single type of retention sensor 20, 22 for use with the retention circuitry. In another embodiment, a plurality of different types of retention sensors 20, 22, such as a heart rate monitor, a temperature sensor, a proximity device, a photodetector, a chemical detector, a biometric detector, a motion sensor and a clasp as described above or any combination thereof, may be provided and the results therefrom combined to determine a retention probability that the device 1 is in the physical possession of the user. A retention probability can be determined from a single type of sensor if required, however combining multiple retention results from a plurality of different types of sensors may increase the reliability of the determination that the device 1 is in the physical possession of the user. There are many ways in which such a plurality of different retention results may be algorithmically combined. The combined result may give rise to a retention probability and when the retention probability falls below a threshold probability the trusted device is switched out of the authenticated state. In some embodiments the retention circuitry 18 may be configured to reduce the retention probability as the time since the last user authentication operation increases. Thus, the retention probability gradually decreases with time since a valid authentication operation was performed until the retention probability falls below the threshold probability and switches the trusted device out of the authenticated state, even if the retention monitoring circuitry indicates that the trusted device remains within the user's possession. This results in periodic re-authentication of the user.

The authentication circuitry 12 may also comprise one or more different types of sensors 14, 16 for performing an authentication operation to authenticate the identity of the user having physical possession of the device 1. Once the user is authenticated the device 1 is switched into an authenticated state. In one embodiment, the authentication circuitry 12 and the sensors 14, 16 function as biometric recognition circuitry configured to recognize one or more biometric characteristics of the user, such as a vein pattern detector for detecting the vein patterns of a user, to authenticate the identity of the user. In another embodiment, the authentication circuitry 12 and the sensors 14, 16 function as a fingerprint sensor configured to recognize the fingerprint of the user in order to authenticate the identity of the user. In another embodiment, the authentication circuitry 12 and the sensors 14, 16 function as face recognition circuitry utilizing a camera provided in the device 1, and configured to use face recognition algorithms to authenticate the identity of the user of the device. In another embodiment, the authentication circuitry 12 and the sensors 14, 16 function as chemical recognition circuitry configured to identify characteristic chemical properties of the skin of the user in order to authenticate the identity of the user. In another embodiment, the authentication circuitry 12 and the sensors 14, 16 function as ECG recognition circuitry configured to recognize the characteristic ECG signal of the user in order to authenticate the identity of the user. In another embodiment, the authentication circuitry 12 and the sensors 14, 16 function as bioimpedance circuitry configured to recognize one or more bioimpedance characteristics of the user in order to authenticate the identity of the user. In another embodiment, the authentication circuitry 12 and the sensors 14, 16 function as gait recognition circuitry configured to recognize the characteristic gait (motion) of a user in order to authenticate the identity of the user. In another embodiment, the authentication circuitry 12 and the sensors 14, 16 function as implant recognition circuitry configured to recognize an implant within the user in order to authenticate the identity of the user. It will be appreciated that there may be further different possibilities that are used to authenticate a user and switch the trusted device 1 into the authenticated state. These alternative techniques may be used instead of or in combination with those set out above.

In one embodiment, the function of the authentication circuitry 12 may be combined with that of the retention circuitry 18, such that the sensors 14, 16, 20 & 22 are configured to authenticate a user and also determine when the device 1 is in the physical possession of the user.

As mentioned above, periodic reauthentication of the trusted device 1 may be required. Reauthentication might also be required if a particularly sensitive communication operation was to be performed, e.g. a transaction authorizing the spending of a small amount of money might be authorized automatically based upon the trusted device 1 being in the authenticated state, whereas a transaction authorizing a larger sum of money might require reauthentication even if the trusted device is in the authenticated state.

When reauthentication is requested, for whatever reason, if the retention circuitry 18 indicates that the trusted device 1 has remained in the physical possession of the user since the previous authentication operation, then a higher rate of false positives in the reauthentication may be tolerated and accordingly a less precise identification of the individual may be accepted to reauthenticate the device. In a similar way, reauthentication performed relatively close in time to a previous authentication operation might require a less precise identification of the individual user (i.e. a higher rate of false positives tolerated) than would otherwise be the case. Such features improve usability by permitting easier reauthentication whilst not significantly reducing the security of the system since what is required is effectively a "top up" of the authentication of the trusted device 1 rather than its authentication from a completely untrusted state.

The communication circuitry 30 may be configured to trigger communication of the target device in response to a plurality of different stimuli. Examples which trigger communication with the target device may include detection of a distance of less than a threshold distance between the target device and the trusted device. Referring to FIG. 3, the trusted device 100 may be moved to within a few centimeters of the point of sale terminal 300 to initiate communication, or the trusted device 100 may be "bumped" against the point of sale terminal 300 to initiate the communication. Another form of stimulus which could trigger the communication would be detection of the user touching the target device 300. Physical touching of the target device may be detected using electrical connection from the trusted device 100 worn on the user's wrist through the skin/body of the user to the target device 300. This technique of activating communication with touch is advantageously intuitive and uniquely identifies the target device in an environment which may contain multiple target devices within wireless radio communication of the trusted device 100. Further forms of stimuli which may trigger the communication are receipt of a message specifying a target device 300 (e.g. receipt of a remote message from another person or a remote server) and/or the user manually selecting a target device 300 with which communication is to be triggered from a list of target devices.

Both the trusted device 100 and/or the target device 300 may be permitted to communicate either in one direction or bi-directionally between each other independently of whether or not they are at that point in time in communication with any further devices, i.e. both the trusted device and the target device are permitted to communicate when they are offline with other devices. Alternatively, communication may only be permitted when the target device or the trusted device itself is online with another device.

The communication may include presentation to the target device of credentials including one or more of: an application-program-interface key, a digital certificate, a user identity, a password and cryptographically signed data. The communication may also involve/trigger the creation of credentials for use in subsequent communications. The communication can involve the transfer of information such as at least one of configuration data, personalization preferences, network settings, contracts, receipts, computer programs, data logs, transaction records and credentials.

The device 1 may also include target authentication circuitry serving to authenticate the target device 300 using information received from the target device 300. Thus, both the target device 300 and the trusted device 100 may authenticate the identity of the other party before communication is performed.

Also illustrated in FIG. 4 is user interface circuitry 36 used for driving the display 3 on the trusted device 1. This display 3 may be used to display information from the target device, such as information specifying the identity of the target device with which communication is currently being made, a message indicating a value of a transaction to be authenticated, etc. The processor 10 may display a message to a user on the display 3 indicating that the user must provide some further information in the form of a confirmation input before communication with the target device is permitted. Such a confirmation input may be made, for example, using the input device 5, for example a button, to confirm that a particular point of sale terminal 300 or transport system turnstile is permitted to deduct the cost of an item or the cost of a travel ticket from the bank account accessed via or cash funds loaded on the trusted device.

FIG. 4 also illustrates a vibration motor 26 which creates vibrations to alert the user to an event. The event may be an incoming email, a software update becoming available, a calendar entry reminder etc. In one embodiment, the vibration motor 26 is activated and will vibrate for a predetermined period of time, such as for example, 1 second, 0.6 seconds etc. when an event is received. In one embodiment, the vibration motor 26 comprises a rotating mass which produces circularly orientated acceleration as it spins. The device 1 further comprises an accelerometer 24 that detects and monitors vibrations/movements of the device 1 when the vibration motor 26 is activated. The detected vibrations/movements of the device 1, when the vibration motor 26 is activated, vary depending on the surface to which the device is placed. By monitoring these vibrations/movements of the device 1 it is possible to determine when the device is and is not attached to a user.

The accelerometer is capable of detecting the force of any vibrations and movements of the device, for each of the three accelerometer axes and the angle of the force relative to the axes. The measurements obtained from the accelerometer can be output in various different formats depending on the type of accelerometer selected, as understood by a person skilled in the art. For example, a digital accelerometer will give measurements using a serial protocol like I2C, SPI or USART, while an analog accelerometer will output a voltage level that is required to be converted to a digital value using an analog to digital converter. In one embodiment, the analog to digital convertor is provided at the accelerometer.

It is then possible to use the accelerometer measurements in order to determine whether the device is or is not in contact with the user, and whether the user is moving.

Figure 5A:
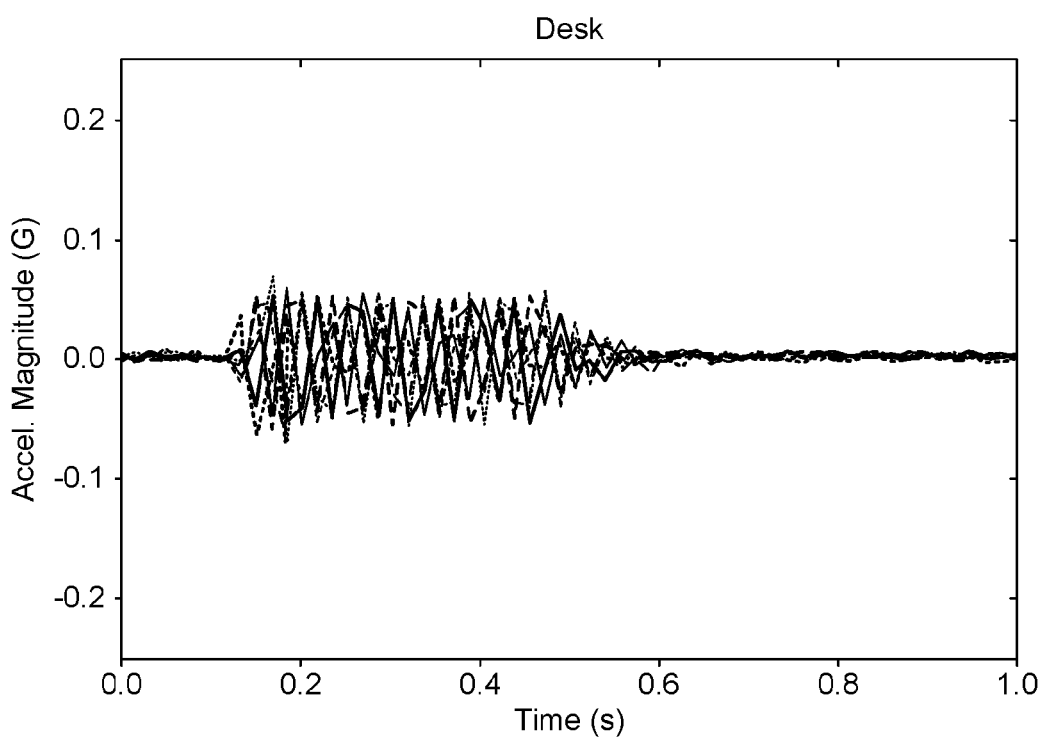
FIGS. 5A to 5D illustrate vibrations detected at a device.
Figure 5B:
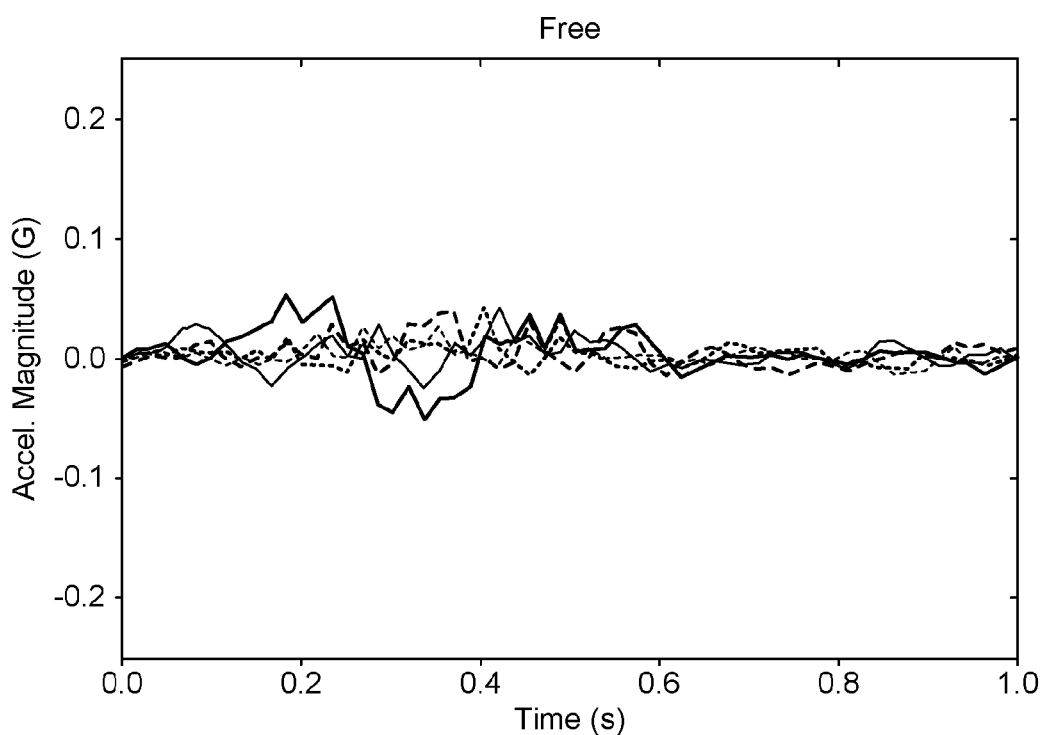
Figure 5C:
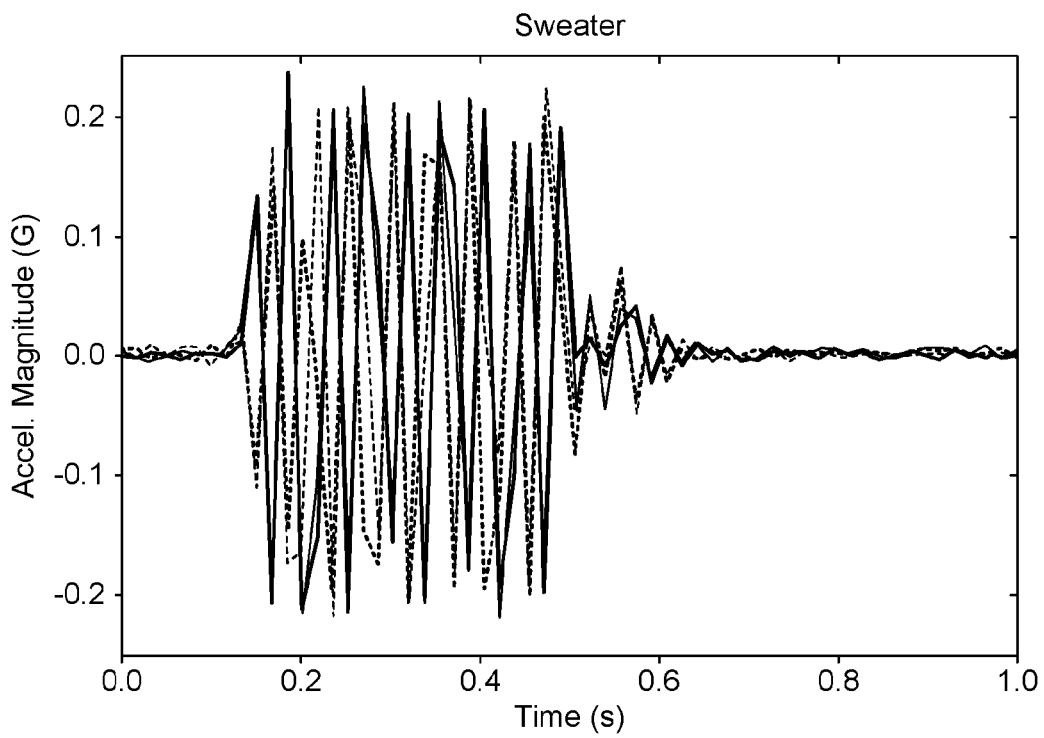
Figure 5D:
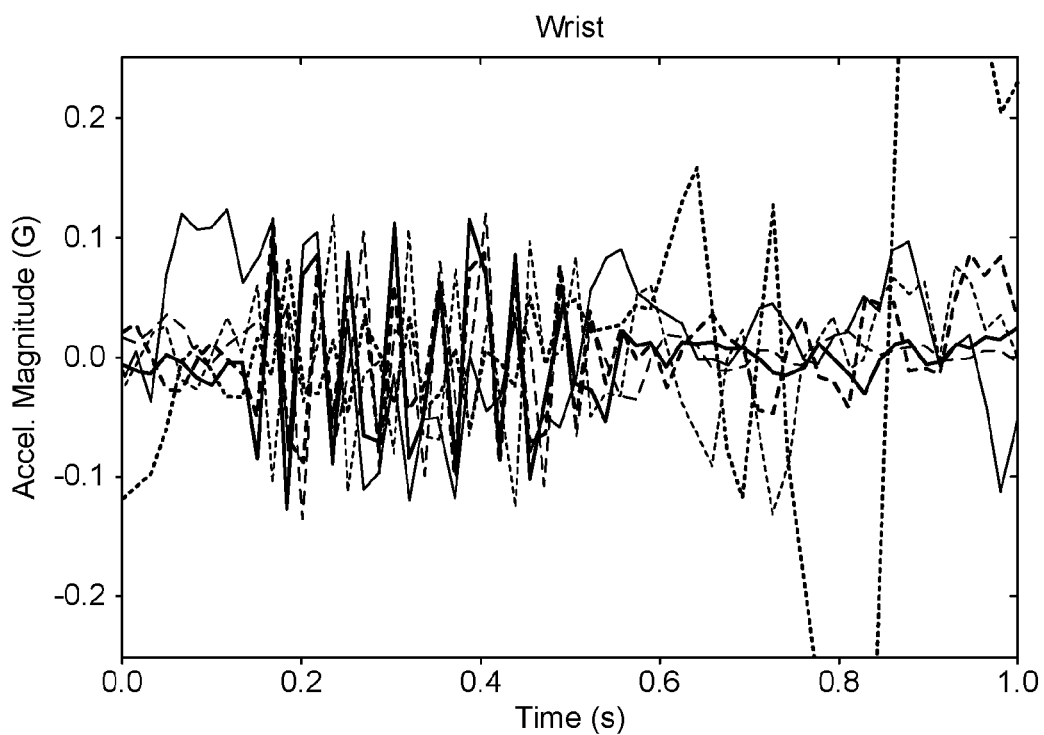

FIGS. 5A to 5D illustrate the vibrations/movements of a device (in this example an iPhone) detected by the accelerometer 24 when the vibration motor 26 was activated and the device was:
1) placed on a desk FIG. 5A;
2) placed on a sweater FIG. 5C;
3) suspended in free space by a cable FIG. 5B; and
4) attached to a user's a wrist using a Velcro strap FIG. 5D.

The user was moving around freely and quite actively.

In all of situations 1 to 4 detailed above, the vibration motor 26 was activated for approximately 0.6 seconds and spun at between 202-203 Hz, and the acceleration data was sampled at 60 Hz. As can be seen from FIGS. 5A to 5D the acceleration magnitude of the vibrations detected at the device are distinctly different depending on the whether the device is placed on a desk, placed on a sweater, suspended in free space or attached to a user's wrist.

Figure 6A:
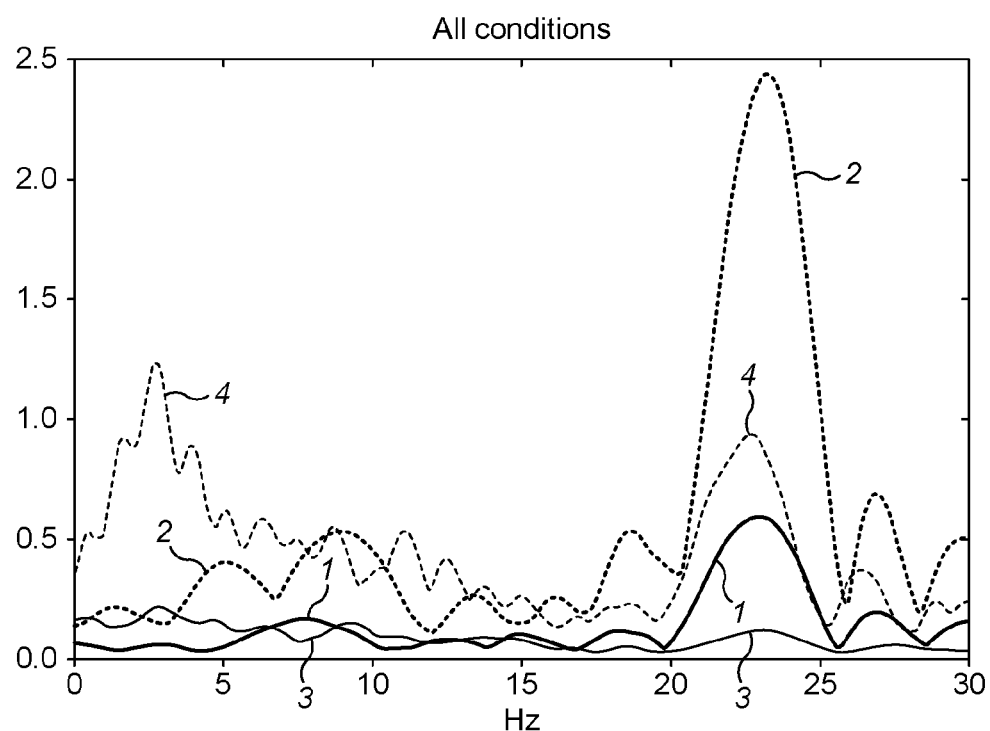
FIGS. 6A to 6C illustrate the signals detected at a device converted to the frequency domain.

A Fast Fourier Transform (FFT) can be applied by the processor 10 to convert the signals detected by the accelerometer 24 to the frequency domain. FIG. 6A illustrates the signals detected in all of situations 1 to 4 detailed above. In all of FIGS. 6A to 6C line 1 indicates the signal detected when the device was placed on a desk, line 2 indicates the signal detected when the device was placed on a sweater, line 3 indicates the signal detected when the device was suspended in free space and line 4 indicates the signal detected when the device was attached to a user's wrist.

It is possible to separate the vibration-induced signal, caused by the vibration motor 26, from the other acceleration signal stemming from movement of the user. As can be seen in FIG. 6A, the low frequency content around 2-4 Hz on the FFT is absent on the desk and sweater detected signals (lines 1 and 2 in FIG. 6A) and present on the wrist detected signal (line 4 in FIG. 6A).

Figure 6B:
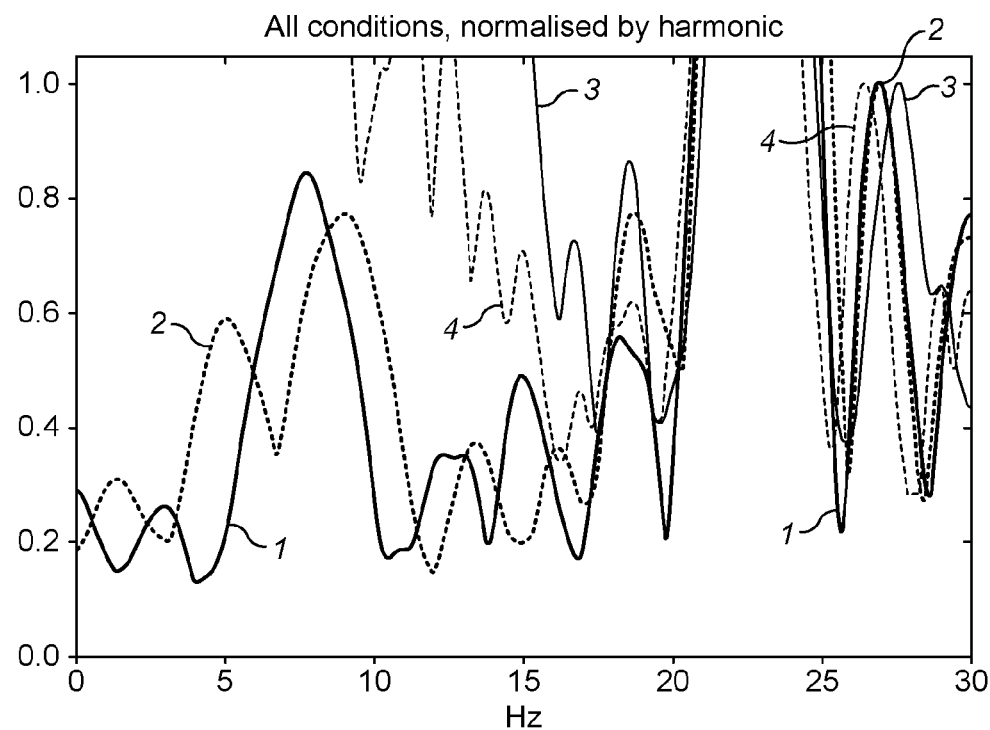
Figure 6C:
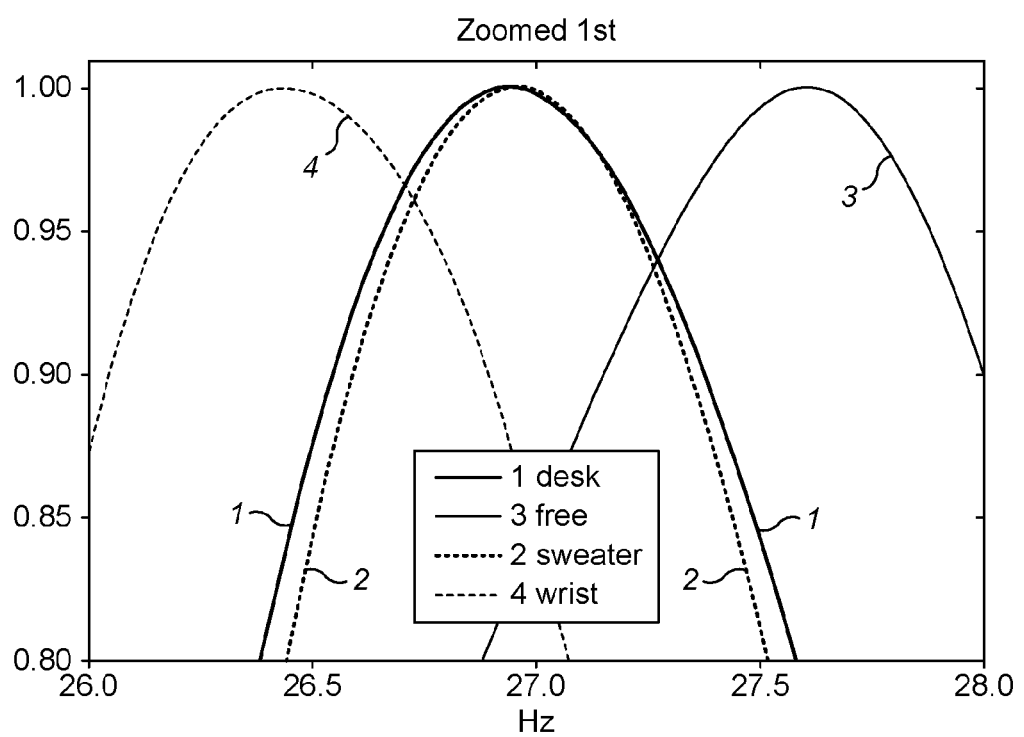

FIG. 6B illustrates all of the data normalized by harmonic and FIG. 6C illustrates the signal of FIG. 6B zoomed in on the frequency range of 26 to 28 Hz. The plots show the frequency noticeably dropping (~1.5%) when the device is attached to a user's wrist, line 4. Since the frequency of the vibrations detected at the device are different depending on the whether the device is placed on a desk, placed on a sweater, suspended in free space or attached to a user's wrist, it is possible to use the detected frequency to determine whether the device is attached to a user's wrist.

In addition, the presence of a user can affect the frequency of the motor. There is only a small variation of the natural/free-hanging frequency (e.g. 1 Hz slower) of the motor detected when the device is in contact with a user, and the variation depends on the motor being used as different models of motors operate at different frequencies, for example 60 Hz or 200 Hz. However, it is possible to use the frequency detected as a result of the vibration motor being activated to determine whether the device is in contact with a user.

When the device 1 is in contact with a user and the vibration motor is activated, a first frequency response is detected indicating that the device is in contact with the user. When the device 1 is not in contact with a user and is provided on a surface, for example a table, then activation of the vibration motor will produce a second frequency response, detected by the accelerometer, indicating that the device is not in contact with the user. The first frequency response is different from the second frequency response.

The accelerometer 24 can also detect and monitor vibrations/movements of the device 1 not created by the vibration motor 26, for example movement of the user to which the device 1 is attached.

In one embodiment, the vibration motor 26 and the accelerometer 24 are provided in the device 1 co-planar with each other. In another embodiment, the vibration motor 26 and the accelerometer 24 are rigidly mounted to the device body.

Figure 7:
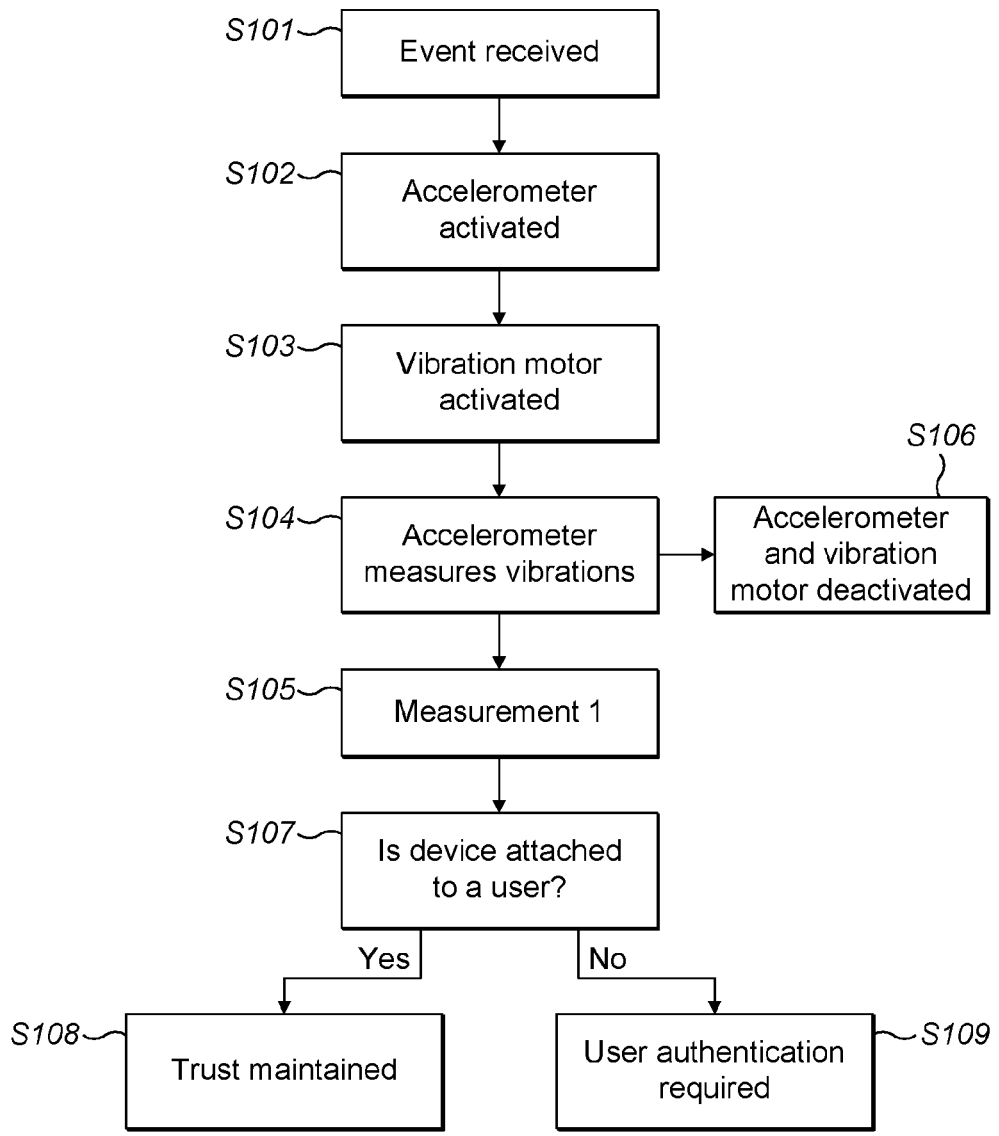
FIG. 7 is a flow diagram schematically illustrating a method for measuring vibrations at the device.

FIG. 7 is a flow diagram schematically illustrating a method for measuring vibrations at the device 1. An event is received at step S101. The accelerometer is activated and starts measuring at step S102. The vibration motor 26 is activated and creates vibrations within the device 1 for a predetermined period of time at step S103 to notify the user of the event being received. The accelerometer 24 measures the resulting vibrations within the device 1 at step S104 during the period that the vibration motor 26 is activated and outputs the measurement (measurement 1) at step S105 to the processor 10. The accelerometer 24 and vibration motor 26 are deactivated at step S106.

It is then determined at step S107 whether the device is attached to a user. When measurement 1 indicates that a first frequency response is detected it is determined that the device is attached to the user at step S107. However, when measurement 1 indicates that a second frequency response is detected it is determined that the device is not attached to the user at step S107. Determination as to whether the device is attached to user can be performed at the processor 10. In one embodiment, measurement 1 is stored at the storage device 28.

If it is determined that the device is attached to the user at step S107, then the level of trust is maintained at step S108. However, if it is determined that the device is not attached to the user at step S107, then user authentication is required at step S109.

In another embodiment, the accelerometer and the vibration motor 26 may be activated periodically, not just when an event is received, so that it can be determined periodically whether the device is attached to the user. The method is similar to the method illustrated in FIG. 7, however, the process begins at step S101 with a predetermined period of time having passed rather than an event being received.

Figure 8:
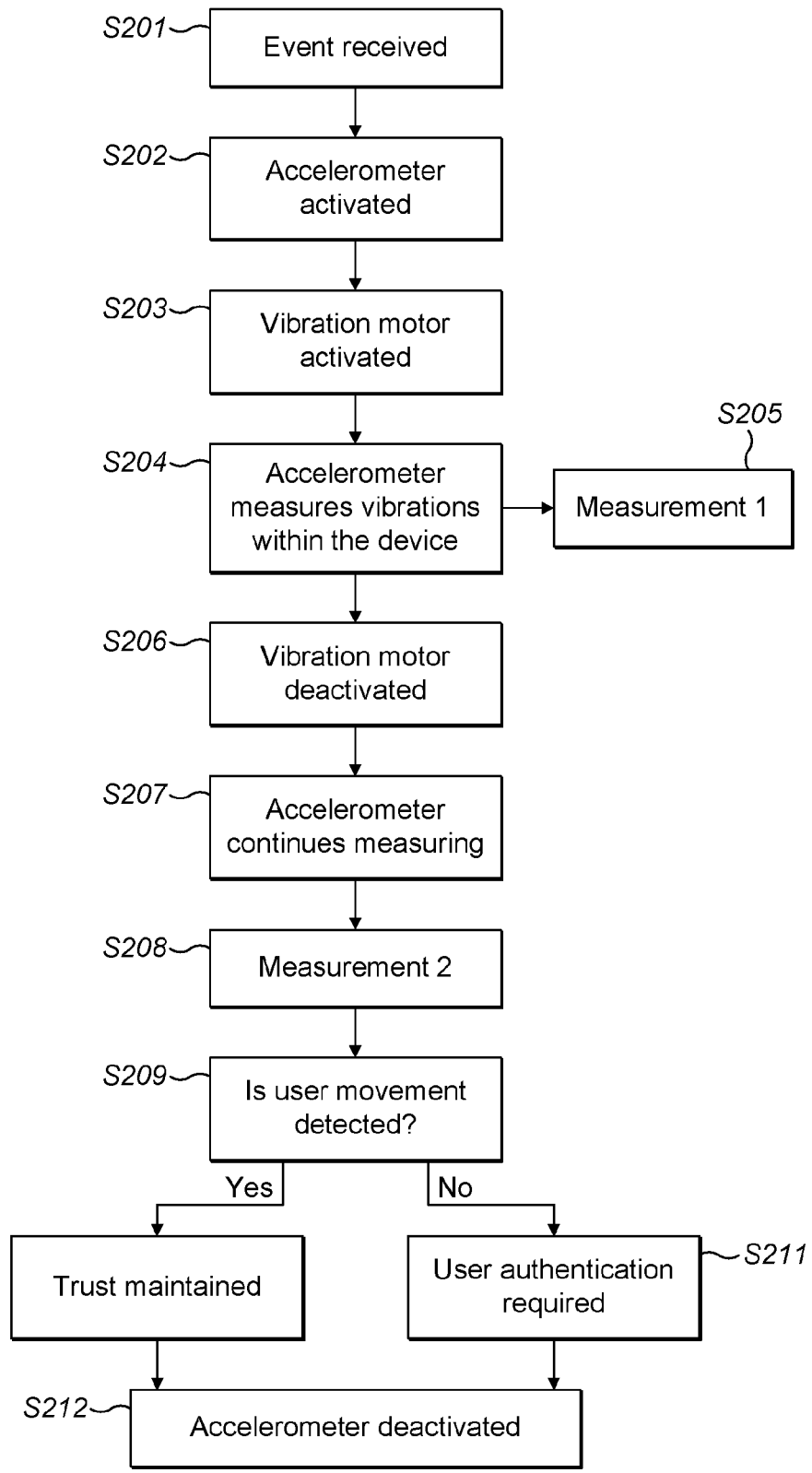
FIG. 8 is a flow diagram schematically illustrating a method for measuring vibrations/movements at the device.

FIG. 8 is a flow diagram schematically illustrating a method for measuring vibrations/movements at the device 1. An event is received at step S201. The accelerometer is activated and starts measuring at step S202. The vibration motor 26 is activated and creates vibrations within the device 1 for a predetermined period of time at step S203 to notify the user of the event being received. The accelerometer 24 measures the resulting vibrations at the device 1 at step S204 during the period that the vibration motor 26 is activated and outputs the measurement (measurement 1) at step S205 to the processor 10. After the predetermined period of time the vibration motor 26 is deactivated at step S206. Measurement 1 is then used to determine whether the device is attached to a user as described above with reference to FIG. 7, steps S107 to S109.

The accelerometer 24 continues measuring at step S207, in order to detect any movements of the user, to which the device is attached, in response to receiving the event notification. For example, the user moving their arm to check the event displayed at the device 1. The accelerometer 24 may continue measuring for a predetermined period of time (for example, 1 minute) following deactivation of the vibration motor 26. The accelerometer 24 outputs a measurement (measurement 2) taken for the predetermined period of time to the processor 10 at step S208. It is then determined at step S209 whether user movement is detected.

The movements of the user are expected to be greater than the vibrations at the device 1 created by the vibration motor 26. Therefore, when measurement 2 indicates that a third frequency response is detected it is determined that the user has moved in response to the event being received.

When it is determined that user movement is detected at step S209, then the level of trust is maintained at step S210. However, when it is determined that user movement is not detected at step S209, then user authentication is required at step S211. The accelerometer 24 is deactivated, after the predetermined period of time, at step S212. The accelerometer 24 may be deactivated before or after it is determined whether that user movement is detected at step S209. In one embodiment, measurement 2 is stored at the storage device 18.

Measurement 1 is used to indicate whether the device is attached to a user, and measurement 2 is used to indicate whether the device is attached to a conscious user.

In one embodiment, measurement 1 and measurement 2 may be one of several other sensed measurements input into an inference algorithm to determine a probability of whether the device is (still) attached to a user. In one embodiment, the inference algorithm is a Bayesian inference algorithm. The other measurement inputs may be any of those detected by the sensors 20, 22 described above and/or a time measurement, for example, is the time since the last user interaction with the device less than a predetermined time? The measurements are combined in the inference algorithm to provide a probability/measure of confidence that the device in the possession of the authenticated user. This probability can also be viewed as a level of trust. The higher the probability, the greater the level of trust is that the device is in the possession of the authorized user, and the lower the probability, the lower the level of trust is that the device is in the possession of the authorised user. The level of trust can be used to determine when reauthentication is required by a user and can also be used when authorizing transactions. For example, when the level of trust is high the user may not be required to reauthenticate when using the device to confirm a transaction, however, when the level of trust is low (but still above the reauthentication threshold) the user may be required to reauthenticate when using the device to confirm a transaction but may not be required to authenticate when using the device to open a door.

Figure 9:
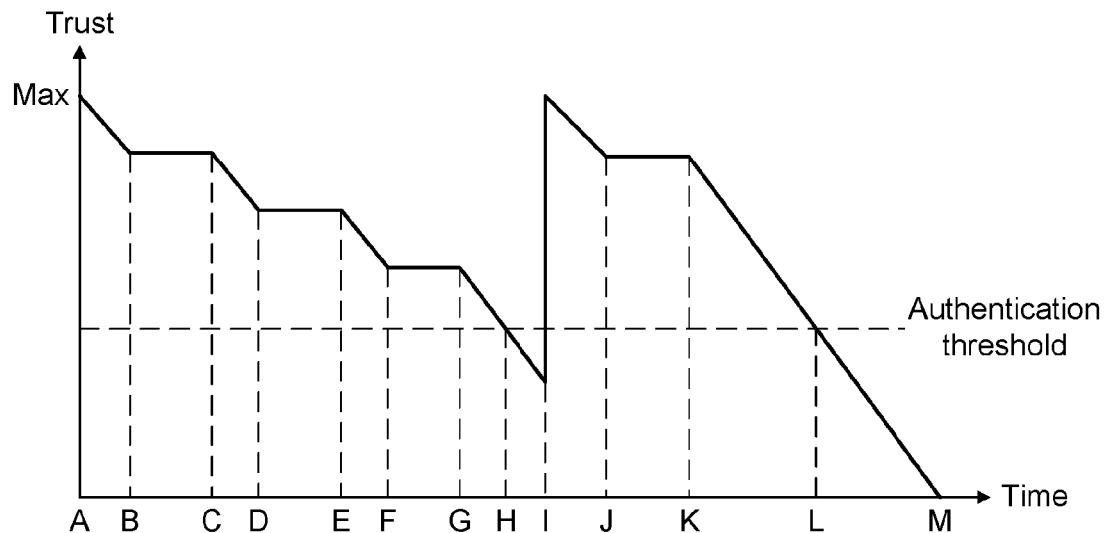
FIG. 9 is a graph schematically illustrating how the level of trust varies with time.

FIG. 9 is a graph schematically illustrating how the level of trust varies with time. At time A the user authenticates the device so the level of trust is high. The level of trust then decreases with time. At time B an event is received at the device 1 and the method illustrated in FIG. 7 and described above is undertaken. It is determined that the device 1 is still attached to the user based on the measurements obtained by the accelerometer, therefore the level of trust is maintained for a period of time. At time C the level of trust begins to decrease with time. At time D an event is received at the device 1 and the method illustrated in FIG. 7 and described above is undertaken. It is determined that the device 1 is still attached to the user based on the measurements obtained by the accelerometer, therefore the level of trust is maintained for a period of time. At time E the level of trust begins to decrease with time. At time F an event is received at the device 1 and the method illustrated in FIG. 7 and described above is undertaken. It is determined that the device 1 is still attached to the user based on the measurements obtained by the accelerometer, therefore the level of trust is maintained for a period of time. At time G the level of trust begins to decrease with time. At time H the level of trust falls below the authentication threshold. At time I the user re-authenticates the device 1, so the level of trust increases to the maximum. At time J an event is received at the device 1 and the method illustrated in FIG. 7 and described above is undertaken. It is determined that the device 1 is still attached to the user based on the measurements obtained by the accelerometer, therefore the level of trust is maintained for a period of time. At time K the level of trust begins to decrease with time until at time L the level of trust falls below the authentication threshold.

In another embodiment, the method illustrated in FIG. 8 and described above is undertaken whenever an event is received. It is determined that the device 1 is still attached to the user and that the user is conscious, based on the measurements obtained by the accelerometer, before the level of trust is maintained for a period of time as illustrated in FIG. 9.

In FIG. 9, the level of trust is maintained for a period of time when an event is received and it is determined that the device 1 is still attached to the user based on the measurements obtained by the accelerometer. The level of trust is not increased as the user has not authenticated the device at these points in time.

Figure 10:
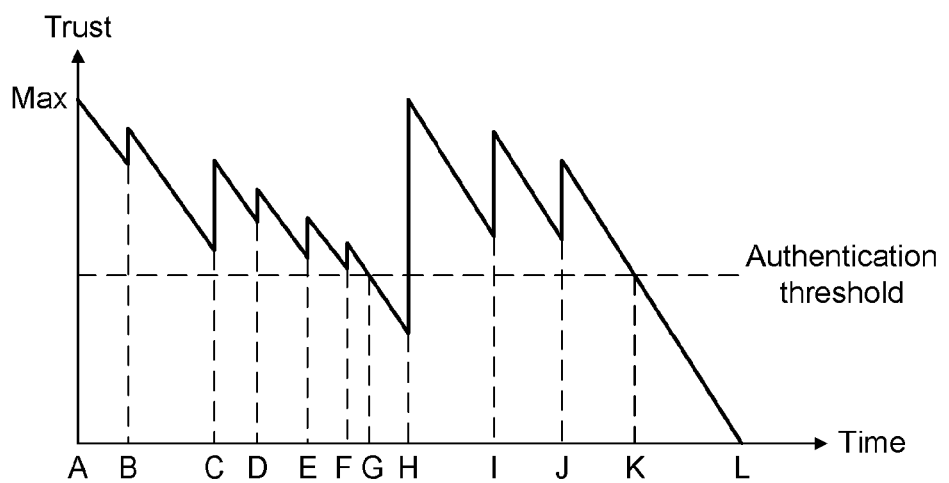
FIG. 10 is a graph schematically illustrating how the level of trust varies with time.

FIG. 10 is another graph schematically illustrating how the level of trust varies with time. At time A the user authenticates the device so the level of trust is high. The level of trust decreases with time. At time B an event is received at the device 1 and the method illustrated in FIG. 5 and described above is undertaken. It is determined that the device 1 is still attached to the user based on the measurements obtained by the accelerometer, therefore the level of trust is increased by a predetermined amount. The level of trust then decreases with time. At time C an event is received at the device 1 and the method illustrated in FIG. 7 and described above is undertaken. It is determined that the device 1 is still attached to the user based on the measurements obtained by the accelerometer, therefore the level of trust is increased by a predetermined amount. The level of trust then decreases with time. At time D an event is received at the device 1 and the method illustrated in FIG. 7 and described above is undertaken. It is determined that the device 1 is still attached to the user based on the measurements obtained by the accelerometer, therefore the level of trust is increased by a predetermined amount. The level of trust then decreases with time. At time E an event is received at the device 1 and the method illustrated in FIG. 7 and described above is undertaken. It is determined that the device 1 is still attached to the user based on the measurements obtained by the accelerometer, therefore the level of trust is increased by a predetermined amount. The level of trust then decreases with time. At time F an event is received at the device 1 and the method illustrated in FIG. 7 and described above is undertaken. It is determined that the device 1 is still attached to the user based on the measurements obtained by the accelerometer, therefore the level of trust is increased by a predetermined amount. The level of trust then decreases with time. At time G the level of trust falls below the authentication threshold. At time H the user re-authenticates the device 1, so the level of trust increases to the maximum. At time I an event is received at the device 1 and the method illustrated in FIG. 7 and described above is undertaken. It is determined that the device 1 is still attached to the user based on the measurements obtained by the accelerometer, therefore the level of trust is increased by a predetermined amount. The level of trust then decreases with time. At time J an event is received at the device 1 and the method illustrated in FIG. 7 and described above is undertaken. It is determined that the device 1 is still attached to the user based on the measurements obtained by the accelerometer, therefore the level of trust is increased by a predetermined amount. The level of trust then decreases with time. At time K the level of trust falls below the authentication threshold. In this embodiment, the level of trust is increased by a predetermined amount every time it is determined that the user is still connected to the device 1, but the overall level of trust slowly decreases with time until the user is required to re-authenticate the device.

In another embodiment, the method illustrated in FIG. 8 and described above is undertaken whenever an event is received. It is determined that the device 1 is still attached to the user and that the user is conscious, based on the measurements obtained by the accelerometer, before the level of trust is increased by the predetermined amount.

Figure 11:
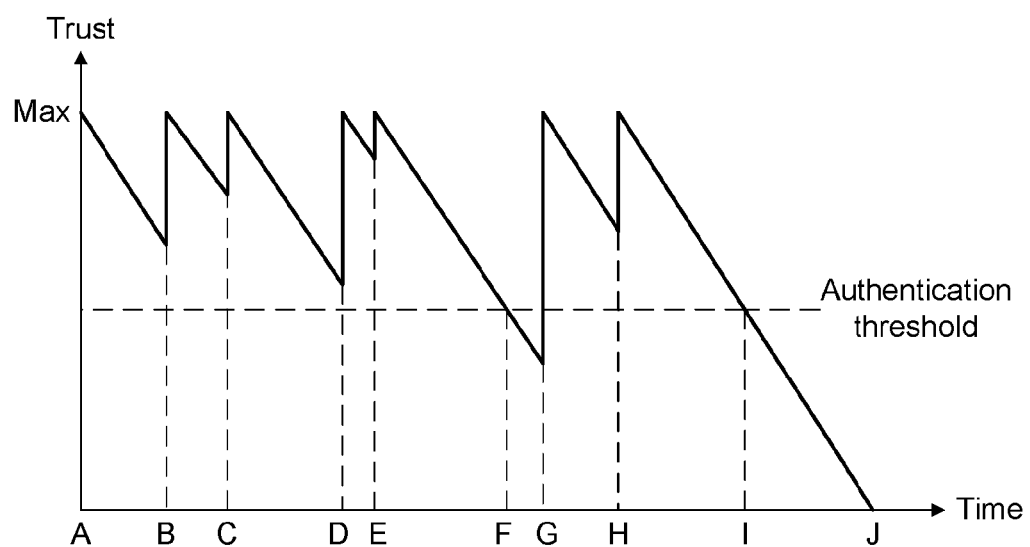
FIG. 11 is a graph schematically illustrating how the level of trust varies with time.

FIG. 11 is another graph schematically illustrating how the level of trust varies with time. At time A the user authenticates the device so the level of trust is high. The level of trust decreases with time. At time B an event is received at the device 1 and the method illustrated in FIG. 7 and described above is undertaken. It is determined that the device 1 is still attached to the user based on the measurements obtained by the accelerometer, therefore the level of trust is returned to maximum. The level of trust then decreases with time. At time C an event is received at the device 1 and the method illustrated in FIG. 7 and described above is undertaken. It is determined that the device 1 is still attached to the user based on the measurements obtained by the accelerometer, therefore the level of trust is returned to maximum. The level of trust then decreases with time. At time D an event is received at the device 1 and the method illustrated in FIG. 7 and described above is undertaken. It is determined that the device 1 is still attached to the user based on the measurements obtained by the accelerometer, therefore the level of trust is returned to maximum. The level of trust then decreases with time. At time E an event is received at the device 1 and the method illustrated in FIG. 7 and described above is undertaken. It is determined that the device 1 is still attached to the user based on the measurements obtained by the accelerometer, therefore the level of trust is returned to maximum. The level of trust then decreases with time. At time F the level of trust falls below the authentication threshold. At time G the user re-authenticates the device 1, so the level of trust increases to the maximum. At time H an event is received at the device 1 and the method illustrated in FIG. 7 and described above is undertaken. It is determined that the device 1 is still attached to the user based on the measurements obtained by the accelerometer, therefore the level of trust is returned to maximum. The level of trust then decreases with time. At time I the level of trust falls below the authentication threshold.

In another embodiment, the method illustrated in FIG. 8 and described above is undertaken whenever an event is received. It is determined that the device 1 is still attached to the user and that the user is conscious, based on the measurements obtained by the accelerometer, before the level of trust is returned to maximum.

In another embodiment, the measurements obtained by the accelerometer are combined with other inputs, such as any of those detected by the sensors 20, 22 and described above, in order to increase the probability of the determination that the device is still attached to the user is correct. The graphs of FIGS. 9, 10 and 11 also apply to the combined input data.

In one embodiment, processing of the accelerometer measurements can be delayed until it is required to be determined whether the device is in contact with the user, for example when an action which requires authentication is required or if the device is provided with a solar cell, when there is enough energy to undertake the processing.

Although the device has been described as a wrist watch, the device could also be implemented as any user worn device, such as a necklace etc.

The apparatus described may be implemented at least in part in software. Those skilled in the art will appreciate that the apparatus described above may be implemented using general purpose computer equipment or using bespoke equipment.

According to another aspect it is determined that the device is attached to the user when the accelerometer measurements indicates that a first frequency response is detected.

According to another aspect it is determined that the device is not attached to the user when the accelerometer measurements indicates that a second frequency response is detected.

According to another aspect the method further comprises: deactivating the vibration motor; measuring with the accelerometer vibrations at the device for a predetermined period of time; and using the accelerometer measurements to determine whether user movements are detected. It is then possible to determine whether the user to whom the device is attached is conscious/moving, and thus whether re-authentication is required.

According to another aspect it is determined that the user of the device is moving when the accelerometer measurements indicates that a third frequency response is detected.

According to another aspect the vibration motor creates vibrations at the device for a predetermined period of time.

According to another aspect the method further comprises: deactivating the accelerometer and the vibration motor.

According to another aspect the device is in a user authenticated state and the method further comprises: switching the device out of the user authenticated state when it is determined that the device is not attached to the user. Therefore, security of the device can be maintained when the user is no longer in contact with the device.

According to another aspect the method further comprises: requesting re-authentication of the user when it is determined that the device is not attached to the user. Maintaining, security of the device when the user is no longer attached to the device.

According to another aspect the device is in a user authenticated state and the method further comprises: maintaining the device in the user authenticated state when it is determined that the device is attached to the user. By maintaining the device in an authenticated state when it is determined that the user is still attached to the device, the user is not required to keep re-authenticating the device which can become burdensome.

According to another aspect a level of trust is associated with the user authenticated state and the method further comprises: maintaining the level of trust when it is determined that the device is attached to the user.

According to another aspect a level of trust is associated with the user authenticated state; and the method further comprises: increasing the level of trust when it is determined that the device is attached to the user.

According to another aspect the accelerometer and the vibration motor are activated periodically. Accordingly, it can be determined periodically when the device is attached to the user.

According to another aspect the accelerometer and the vibration motor are activated when an event is received at the device.

According to another aspect the method further comprises: deactivating the vibration motor; measuring with the accelerometer vibrations at the device for a predetermined period of time; and using the accelerometer device measurements and the accelerometer vibration measurements to determine the retention probability. Both measurements can be used to determine when the device is in contact with a user and whether the user is moving/conscious. It can then be determined whether re-authentication of the device is required. For example, when it is determined that the user is not moving, re-authentication of the device is required.

According to another aspect the vibration motor creates vibrations at the device for a predetermined period of time.

According to another aspect the method further comprises: deactivating the accelerometer and the vibration motor.

According to another aspect the device is in a user authenticated state and the method further comprises: switching the device out of the user authenticated state when it is determined that the retention probability is below the predetermined threshold. The security of the device can be maintained by requiring the user to re-authenticate the device when the retention probability falls below the threshold.

According to another aspect the method further comprises: requesting re-authentication of the user via an authentication sensor when it is determined that the retention probability is below the predetermined threshold.

According to another aspect the device is in a user authenticated state and the method further comprises: maintaining the device in the user authenticated state when it is determined that the retention probability is above a predetermined threshold. By maintaining the device in an authenticated state when it is determined that the user is still in contact with the device (since the retention probability is above the predetermined threshold), the user is not required to keep re-authenticating the device which can become burdensome.

According to another aspect a level of trust is associated with the user authenticated state and the method further comprises: maintaining the level of trust when it is determined that the retention probability is above a predetermined threshold.

According to another aspect a level of trust is associated with the user authenticated state; and the method further comprises: increasing the level of trust when it is determined that the retention probability is above a predetermined threshold.

According to another aspect the accelerometer and the vibration motor are activated periodically.

According to another aspect the accelerometer and the vibration motor are activated when an event is received at the device.

According to another aspect the method further comprises at least one of: measuring the users heart rate using a heart rate monitor provided at the device; measuring the users temperature using a temperature sensor provided at the device; measuring the users proximity to the device using a proximity device provided at the device; measuring light detected at the device using a photo-detector provided at the device; measuring the users chemical characteristics using a chemical detector provided at the device; measuring the users biometric characteristics using a biometric detector provided at the device; measuring the users movement using a motion sensor provided at the device; measuring opening and closing of a clasp; and determining the retention probability using the at least one of, the users heart rate, users temperature, the users proximity to the device, the light detected at the device, the users chemical characteristics, the users biometric characteristics, the users movement, the opening and closing of the clasp, and the accelerometer device measurements. A plurality of different measurements can be used in order to increase the reliability of the determination of when the device is in contact with the user or when the device is not in contact with the user and requires re-authentication.

Those skilled in the art will appreciate that while the foregoing has described what is considered to be the best mode and where appropriate other modes of performing the present techniques, the present techniques should not be limited to the specific configurations and methods disclosed in this description. Those skilled in the art will recognise that present techniques have a broad range of applications, and that the embodiments may take a wide range of modifications without departing from the scope of the appended claims.

The invention claimed is:

1. A method for determining when a device is attached to a user, the method comprising:
    activating an accelerometer provided at the device;
    activating a vibration motor provided at the device;
    measuring, with the accelerometer, vibrations at the device created by the vibration motor as first accelerometer measurements; and
    using the first accelerometer measurements to determine whether the device is attached to the user, wherein it is determined that the device is attached to the user when the first accelerometer measurements indicate that a first frequency response is detected;
    deactivating the vibration motor;
    measuring, with the accelerometer, vibrations at the device for a predetermined period of time as second accelerometer measurements; and
    using the second accelerometer measurements to determine whether user movements are detected.

2. The method of claim 1, wherein it is determined that the device is not attached to the user when the accelerometer measurements indicates that a second frequency response is detected.

3. The method of claim 1, wherein it is determined that the user of the device is moving when the accelerometer measurements indicates that a third frequency response is detected.

4. The method of claim 1, wherein the vibration motor creates vibrations at the device for a predetermined period of time.

5. The method of claim 1, further comprising:
    deactivating the accelerometer and the vibration motor.

6. The method of claim 1, wherein the device is in a user authenticated state; and further comprising:
    switching the device out of the user authenticated state when it is determined that the device is not attached to the user.

7. The method of claim 6, further comprising:
    requesting re-authentication of the user when it is determined that the device is not attached to the user.

8. The method of claim 1, wherein the device is in a user authenticated state; and further comprising:
    maintaining the device in the user authenticated state when it is determined that the device is attached to the user.

9. The method of claim 6, wherein a level of trust is associated with the user authenticated state; and further comprising:
    maintaining the level of trust when it is determined that the device is attached to the user.

10. The method of claim 6, wherein a level of trust is associated with the user authenticated state; and further comprising:
    increasing the level of trust when it is determined that the device is attached to the user.

11. The method of claim 1, wherein the accelerometer and the vibration motor are activated periodically.

12. The method of claim 1, wherein the accelerometer and the vibration motor are activated when an event is received at the device.

13. A method for determining a retention probability indicating whether a user device is in contact with a user, the method comprising:
    activating an accelerometer provided at the device;
    activating a vibration motor provided at the device;
    measuring, with the accelerometer, vibrations at the device created by the vibration motor as first accelerometer measurements;
    deactivating the vibration motor;
    measuring, with the accelerometer, vibrations at the device for a predetermined period of time as second accelerometer measurements;
    using a frequency response of the first accelerometer measurements and the second accelerometer measurements to determine the retention probability; and
    determining that the device is in contact with the user when the retention probability is above a predetermined threshold.

14. The method of claim 13, wherein the vibration motor creates vibrations at the device for a predetermined period of time.

15. The method of claim 13, further comprising:
    deactivating the accelerometer and the vibration motor.

16. The method of claim 13, wherein the device is in a user authenticated state; and further comprising:
    switching the device out of the user authenticated state when it is determined that the retention probability is below the predetermined threshold.

17. The method of claim 16, further comprising:
    requesting re-authentication of the user via an authentication sensor when it is determined that the retention probability is below the predetermined threshold.

18. The method of claim 13, wherein the device is in a user authenticated state; and further comprising:
    maintaining the device in the user authenticated state when it is determined that the retention probability is above a predetermined threshold.

19. The method of claim 16, wherein a level of trust is associated with the user authenticated state; and further comprising:
    maintaining the level of trust when it is determined that the retention probability is above a predetermined threshold.

20. The method of claim 16, wherein a level of trust is associated with the user authenticated state; and further comprising:
  increasing the level of trust when it is determined that the retention probability is above a predetermined threshold.

21. The method of claim 13, wherein the accelerometer and the vibration motor are activated periodically.

22. The method of claim 13, wherein the accelerometer and the vibration motor are activated when an event is received at the device.

23. The method of claim 13, further comprising at least one of:
  measuring the user's heart rate using a heart rate monitor provided at the device;
  measuring the user's temperature using a temperature sensor provided at the device;
  measuring the user's proximity to the device using a proximity device provided at the device;
  measuring light detected at the device using a photodetector provided at the device;
  measuring the user's chemical characteristics using a chemical detector provided at the device;
  measuring the user's biometric characteristics using a biometric detector provided at the device;
  measuring the user's movement using a motion sensor provided at the device;
  measuring opening and closing of a clasp; and
  determining the retention probability using the at least one of, the user's heart rate, user's temperature, the user's proximity to the device, the light detected at the device, the user's chemical characteristics, the user's biometric characteristics, the user's movement, the opening and closing of the clasp, and the accelerometer device measurements.

* * * * *